United States Patent
Lay et al.

(10) Patent No.: US 10,279,563 B2
(45) Date of Patent: May 7, 2019

(54) SASH GARNISH PRESS SYSTEM AND METHOD

(71) Applicant: Honda Motor Co., Ltd., Tokyo (JP)

(72) Inventors: Jack D. Lay, Mechanicsburg, OH (US); Ian William Meathrel, Hilliard, OH (US); Michael Phillip Schnee, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 15/273,774

(22) Filed: Sep. 23, 2016

(65) Prior Publication Data
US 2017/0088207 A1    Mar. 30, 2017

Related U.S. Application Data

(60) Provisional application No. 62/234,205, filed on Sep. 29, 2015.

(51) Int. Cl.
| | |
|---|---|
| *B32B 41/00* | (2006.01) |
| *B32B 7/12* | (2006.01) |
| *B30B 15/06* | (2006.01) |
| *B29C 65/48* | (2006.01) |
| *B29C 65/00* | (2006.01) |
| *B29C 63/02* | (2006.01) |
| *B29C 63/00* | (2006.01) |
| *B60R 13/04* | (2006.01) |
| *B29L 31/30* | (2006.01) |

(52) U.S. Cl.
CPC ............ *B32B 7/12* (2013.01); *B29C 63/0073* (2013.01); *B29C 63/02* (2013.01); *B29C 65/48* (2013.01); *B29C 66/80* (2013.01); *B30B 15/062* (2013.01); *B60R 13/04* (2013.01); *B29L 2031/3014* (2013.01)

(58) Field of Classification Search
CPC ....... B32B 7/12; B60R 13/04; B29C 63/0073; B29C 63/02; B29C 66/80; B29C 65/48; B30B 15/062; B29L 2031/3014
USPC .......................... 156/64, 350, 351, 378, 379
See application file for complete search history.

(56) References Cited

U.S. PATENT DOCUMENTS

| | | |
|---|---|---|
| 4,760,636 A | 8/1988 | St. Angelo, Jr. et al. |
| 5,820,725 A | 10/1998 | Maeda et al. |
| 6,152,203 A | 11/2000 | Maeda |
| 6,447,638 B1 | 9/2002 | Maeda |
| 6,508,287 B1 | 1/2003 | Shinozaki et al. |
| 6,585,023 B2 | 7/2003 | Azuhata |
| 6,601,630 B2 | 8/2003 | Kang |
| 6,698,489 B1 * | 3/2004 | Shinozaki ............ B65H 37/005 156/574 |
| 6,748,993 B1 | 6/2004 | Shinozaki et al. |
| 6,796,351 B1 | 9/2004 | Maeda |

(Continued)

*Primary Examiner* — Michael N Orlando
*Assistant Examiner* — Joshel Rivera
(74) *Attorney, Agent, or Firm* — Armstrong Teasdale LLP

(57) ABSTRACT

A sash garnish press for affixing a door garnish that includes an adhesive to a vertical sash of a vehicle door is disclosed. The sash garnish press includes a press head and a support head that are positioned on opposite sides of a vertical sash and door garnish of a vehicle door. The press head includes at least one compression actuator that applies compression to the door garnish, thereby compressing the adhesive between the door garnish and the vertical sash, resulting in the attachment of the door garnish to the vertical sash.

20 Claims, 10 Drawing Sheets

(56) References Cited

U.S. PATENT DOCUMENTS

| | | |
|---|---|---|
| 7,152,651 B2 | 12/2006 | Fujiwara |
| 7,234,499 B2 | 6/2007 | Fujino |
| 7,287,567 B2 | 10/2007 | Fujiwara |
| 7,299,845 B2 | 11/2007 | Morimoto et al. |
| 7,506,678 B2 | 3/2009 | Degawa et al. |
| 7,748,094 B2 | 7/2010 | Yamamoto et al. |
| 8,002,009 B2 | 8/2011 | Anderson |
| 8,187,409 B2 | 5/2012 | Anderson |
| 8,336,184 B2 | 12/2012 | Yamamoto et al. |
| 2008/0000588 A1 | 1/2008 | Nakagawa et al. |
| 2016/0304144 A1* | 10/2016 | MacArthur ............ B62D 65/14 |

\* cited by examiner

SASH GARNISH PRESS SYSTEM AND METHOD

CROSS-REFERENCE TO RELATED APPLICATIONS

This application claims the benefit of U.S. Provisional Application No. 62/234,205 filed Sep. 29, 2015, the disclosure of which is incorporated herein by reference in its entirety.

BACKGROUND

The present disclosure relates generally to door garnish mounting devices for vehicles.

During manufacture and assembly of a vehicle, garnishes are assembled and applied to doors of the vehicle. The door garnishes are adhered to the exterior surface of the door, such as the door sash, adjacent to the B-pillar of the vehicle body using adhesive, such as double sided tape. An installer removes the backing tape and manually adheres the door garnish to the door sash by applying pressure using a hand roller. However, due to variation in the pressure applied by the installer, the door garnish may not remain properly adhered to the door, which may potentially lead to a visual defect and increased wind noise in the vehicle cabin.

A need remains for a method and device of reliably and consistently applying door garnishes during vehicle assembly.

SUMMARY

In accordance with one embodiment, a sash garnish press for affixing a door garnish comprising an adhesive to a vertical sash of a vehicle door is provided. The sash garnish press includes: a press head comprising at least one compression actuator, each compression actuator configured to apply compression to at least a portion of the door garnish; and a support head comprising at least one support pad, the at least one support pad configured to support the vertical sash during compression of the at least a portion of the door garnish. The vertical sash and door garnish are positioned between the press head and the support head and the at least one compression actuator is activated to compress the adhesive between the door garnish and the vertical sash, thereby affixing the door garnish to the vertical sash.

In accordance with another embodiment, a method of affixing a door garnish comprising an adhesive to a vertical sash of a vehicle door using a sash garnish press comprising a press head and a support head is provided. The method includes: receiving the vehicle door within the sash garnish press, wherein the vertical sash and the door garnish are positioned between the press head and the support head; positioning the press head adjacent to the door garnish and positioning the support head adjacent to an inner surface of the vertical sash opposite to the door garnish; and operating at least one compression actuator of the press head to apply compression to the door garnish to affix the door garnish to the vertical sash.

In accordance with an additional embodiment, a production line station comprising a sash garnish press for affixing a door garnish comprising an adhesive to a vertical sash of a vehicle door is provided. The production line station includes: a frame configured to support the sash garnish press; and the sash garnish press. The sash garnish press includes an actuated platform attached to the frame. The actuated platform includes: a main platform coupled to the frame, the main platform comprising a first actuator configured to rotate the actuated platform relative to the frame; a press head mounting arm attached at one end to the main platform and to a press head at an opposite end, the press head mounting arm comprising at least one press head actuator configured to translate and/or rotate the press head; a support head mounting arm attached at one end to the main platform and to the support head at an opposite end, the support head mounting arm comprising at least one support head actuator configured to translate and/or rotate the support head. The sash garnish press further includes: the press head comprising at least one compression actuator, each compression actuator configured to apply compression to at least a portion of the door garnish; and the support head comprising at least one support pad, the at least one support pad configured to support the vertical sash during compression of the at least a portion of the door garnish. The first actuator, the at least one press head actuator, and the at least one support head operate in a coordinated manner to position the press head adjacent to the door garnish and to position the support head adjacent to the inner surface of the vertical sash opposite to the door garnish; and the at least one compression actuator is activated to compress the adhesive between the door garnish and the vertical sash, thereby affixing the door garnish to the vertical sash.

DETAILED DESCRIPTION

Various embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for mounting door garnishes onto doors of a vehicle are provided. It should be noted that although the various embodiments are described in connection with door garnishes, one or more embodiments may be implemented in different applications, such as for mounting garnishes onto other parts of the body of a vehicle. Additionally, while various embodiments are described in connection with mounting garnishes in automotive vehicles, one or more embodiments may be implemented in different types of vehicles.

Figure 1:
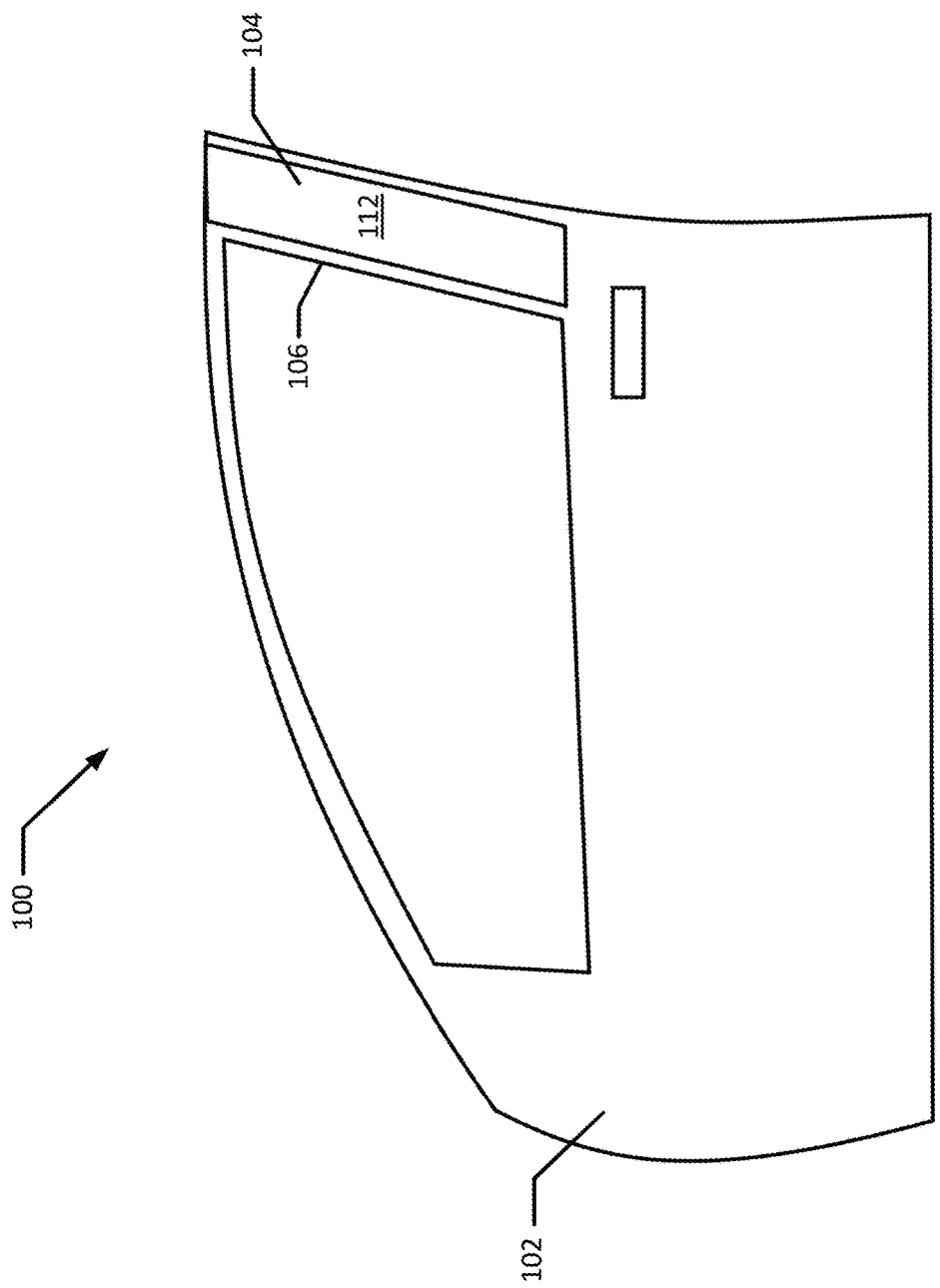
FIG. 1 is a side view of a car door with door sash garnish.
Figure 2:
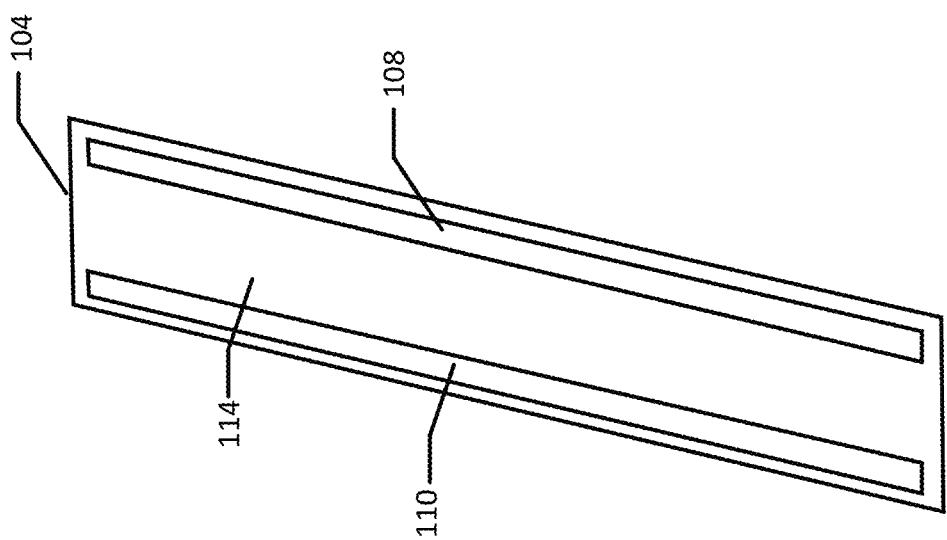
FIG. 2 is an view of an interior side of a door sash garnish in accordance with one embodiment.

FIG. 1 is a side view of a door 102 of a vehicle 100 in an assembly line of an automotive assembly plant. The door 102 includes a door garnish 104 affixed to a vertical sash 106, including but not limited to a B-pillar, of the vehicle door 102. FIG. 2 is a view of an interior side 114 of the door garnish 104 in one embodiment. The interior side 114 is the non-visible side of the door garnish 104 after installation on the vehicle door 102. As illustrated in FIG. 2, the door garnish 104 may include at least one segment of adhesive tape 108/110.

Referring again to FIG. 1, the door garnish 104 is affixed to the door sash by applying a compression to an exterior surface 112 of the door garnish 104 (i.e., the surface of the door garnish 104 that faces away from the vertical sash 106 and is visible once the door garnish 104 is installed on the vehicle door 102), causing the compression of the adhesive tape segments 108/110 between the door garnish 104 and the vertical sash 106. In order to enable a robust attachment of the door garnish 104 to the vertical sash 106, the compression must be high enough to cause "wetting out" of the adhesive tape segments 108/110. "Wetting out" as defined herein, refers to the flow of an adhesive over the adjacent surfaces of the door garnish 104 and the vertical sash 106 to maximize the contact areas of the adhesive, thereby enhancing the strength of the adhesive bond. The pressure needed to achieve "wetting out" may be defined by the manufacturer of an adhesive tape and/or through testing of the tape in a specific application. Non-limiting examples of suitable adhesives for affixing the door garnish 104 to the vertical sash 106 include double sided foam tape and other adhesives, such as epoxy.

Sash Garnish Press

Figure 3:
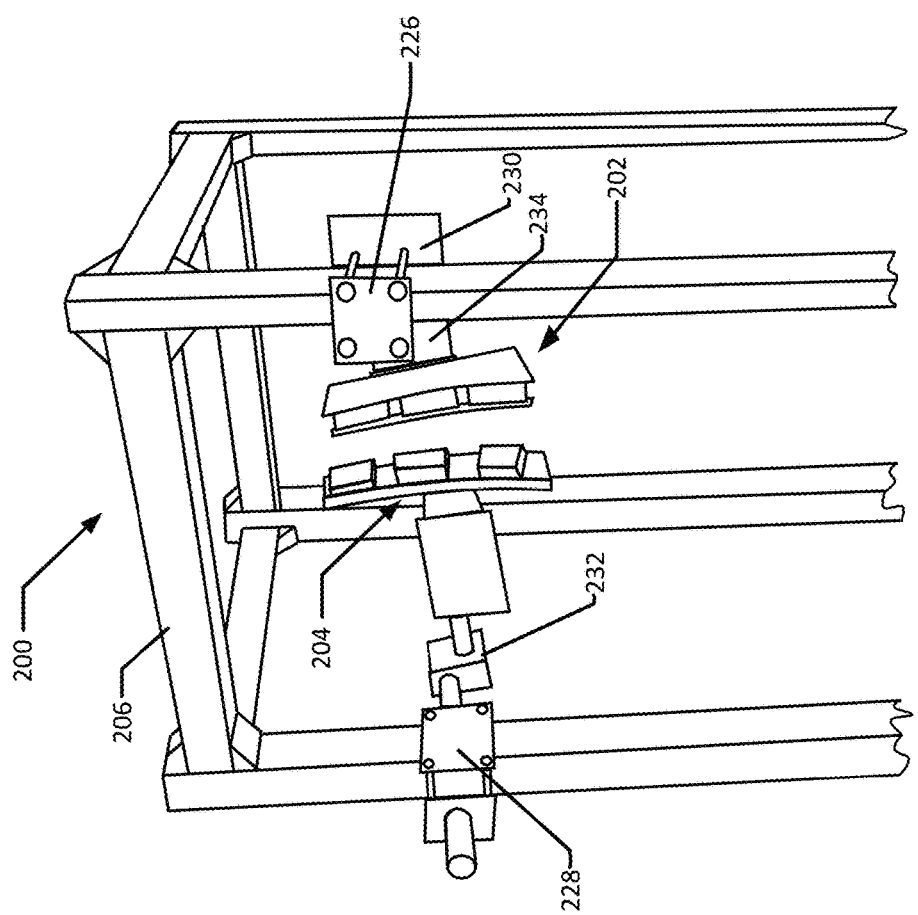
FIG. 3 is a perspective view of a sash garnish press system in accordance with one embodiment.

In various embodiments, the door garnish 104 may be affixed to the vertical sash 106 of a vehicle door 102 using a sash garnish press. FIG. 3 is a perspective view of a sash garnish press 200 in one embodiment. As illustrated in FIG. 3, the sash garnish press 200 includes a press head 202 and a support head 204 attached to a frame 206. In use, the vertical sash 106 of the vehicle door 102 (not shown) is situated between the press head 202 and the support head 204. The press head 202 provides a means of applying compressions in a controlled and repeatable manner to the door garnish 104 in which the compression is sufficient to achieve wet-out of the adhesive, thereby enhancing the bond strength of the adhesive. The support head 204 provides support to the vertical sash 106 as compressions are applied by the press head 202. The frame 206 provides structural support to maintain the press head 202 and the support head 204 in positions suitable for receiving the vertical sash 106 of the vehicle door 102 and applying the compressions to the door garnish 104. In various embodiments, the frame 206 and sash garnish press 200 may together form an assembly line station for affixing the door garnish 104 to the vertical sash 106 of a vehicle door 102.

Figure 4:
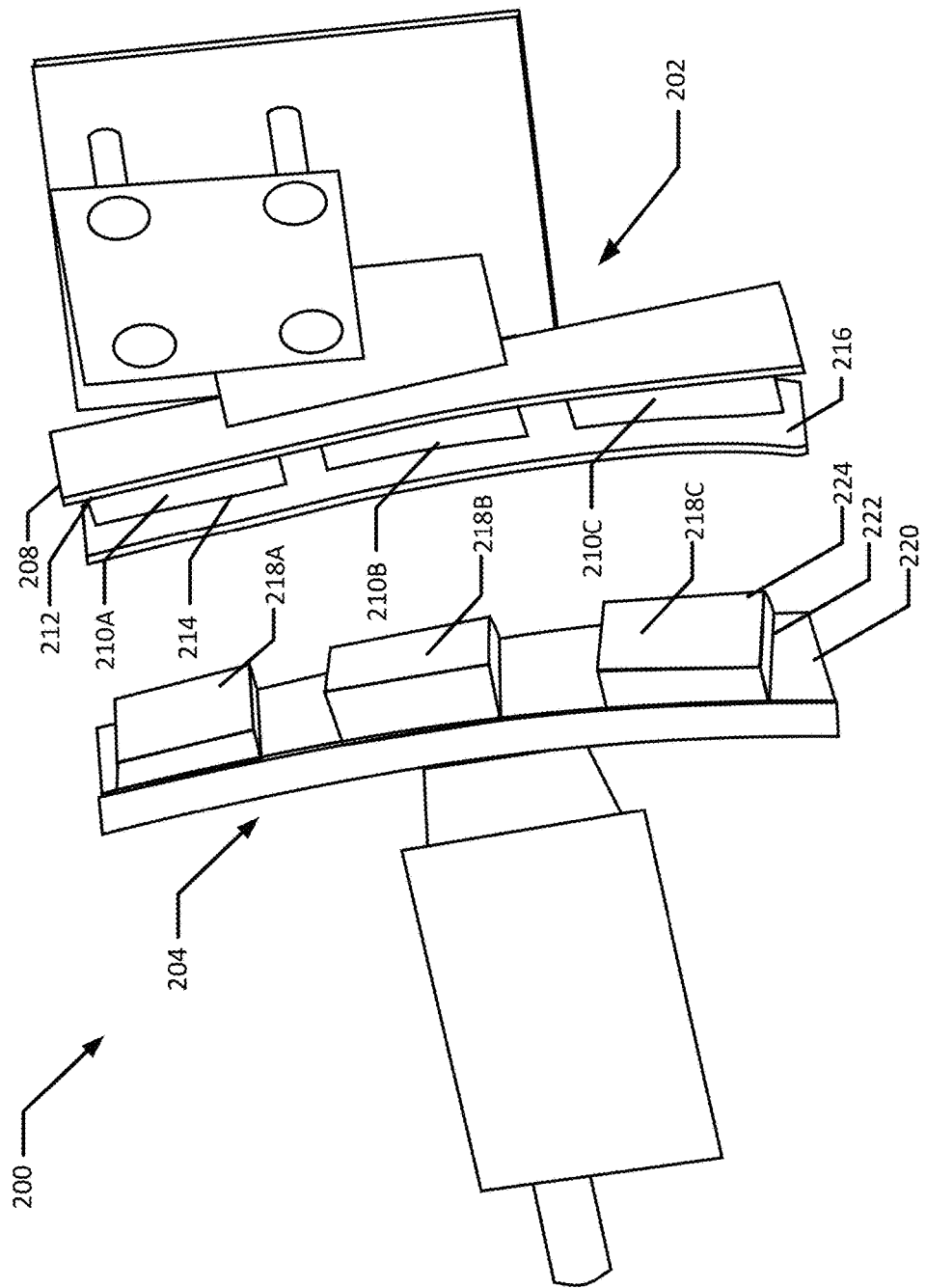
FIG. 4 is a perspective view of a press head and a support head of a sash garnish press system in accordance with one embodiment.

FIG. 4 is a close-up view of the press head 202 and the support head 204 of the sash garnish press 200 in one embodiment. As illustrated in FIG. 4, the press head 202 may include a compression base 208 and at least one compression actuator 210A/210B/210C attached at a fixed end 212 to the compression base 208. The compression base 208 provides a structural attachment for the at least one compression actuator 210A/210B/210C and further maintains the at least one compression actuator 210A/210B/210C in a fixed spatial arrangement. Non-limiting examples of characteristics defining the fixed spatial arrangement of the at least one compression actuator 210A/210B/210C include: the relative spacing of adjacent compression actuators 210A/210B and/or 210B/210C; the distance and/or angle at which a free end 214 each compression actuator 210A/210B/210C projects from the compression base 208, and any other relevant aspect of the spatial arrangement of the at least one compression actuator 210A/210B/210C.

Referring again to FIG. 4, the press head 202 may further include a contact element 216 attached to a free end 214 of each of the at least one compression actuators 210A/210B/210C in one embodiment. In various embodiments, the contact element 216 is a flexible sheet configured to conform to a range of contours associated with the door garnish 104 and vertical sash 106 of the vehicle door 102. The contact element 216 may conform to the contours associated with different vehicle doors 102 including, but not limited to, different doors 102 from the same vehicle 100 (i.e. front and back doors), and doors 102 from different models of vehicle 100.

In one embodiment, the contact element 216 is constructed of a non-marring material to reduce the likelihood of scratching, denting, deforming, or otherwise altering the external appearance of the door garnish 104 and vertical sash 106 as a result of affixing the door garnish 104 to the vertical sash 106 using the sash garnish press 200 as described herein below. In another embodiment, the contact element 216 provides a non-slip interface through which the compressions generated by the at least one compression actuator 210A/210B/210C may be applied to the door garnish 104. In some embodiments, the contact element 216 is constructed of a compressible material to facilitate a more gradual application of compressions to the door garnish 104 and thereby reduce the possibility of damage to the door garnish 104 or to the vertical sash 106 as a result of affixing the door garnish 104 using the sash garnish press 200. Non-limiting examples of suitable non-marring materials include: rubbers, polymers such as polypropylene and polyurethane, nylon, Teflon, silicone, and any combination thereof.

Figure 10:
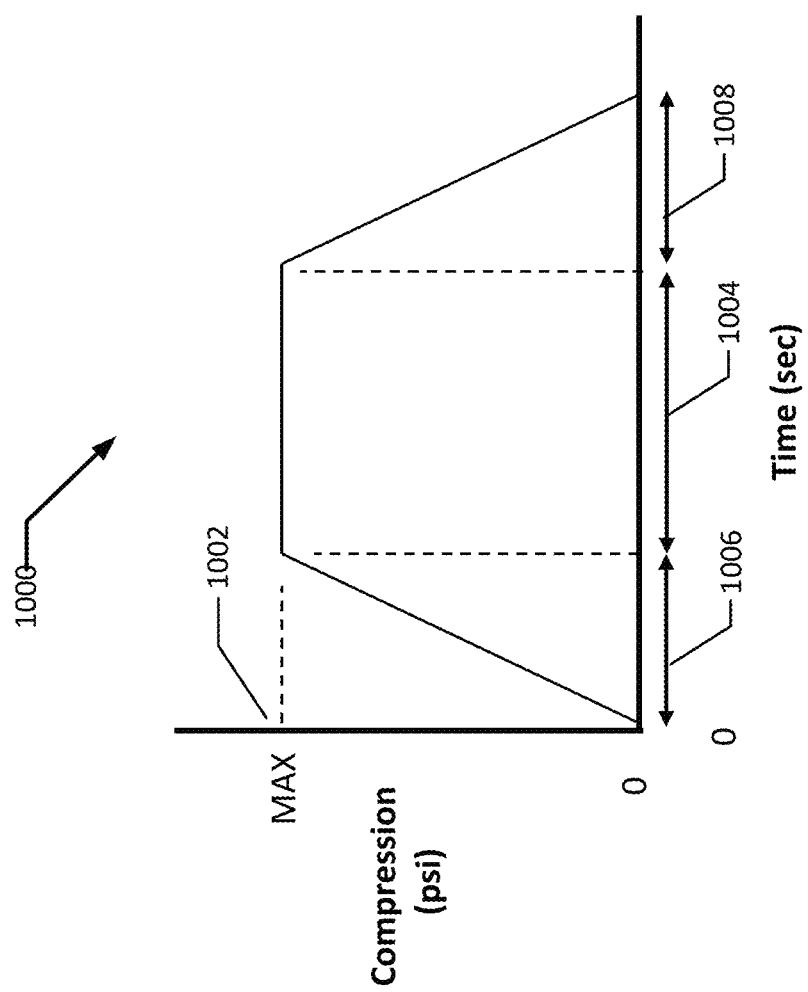
FIG. 10 is a graph schematically illustrating a compression profile in accordance with one embodiment.

In various embodiments, the at least one compression actuator 210A/210B/210C generates a reliable and repeatable amount of compression to the door garnish 104 via the contact element 216. The term "compression", as used herein, refers to a pressure generated by a compression actuator 210 that is applied to at least a region of the door garnish 104 in various embodiments. Each compression actuator 210 is selected to generate a compressive force through a contact area corresponding to the area of the free end 214 of the compression actuator 210. In various embodiments, the compression actuator 210 generates the compression according to a predetermined compression profile 1000. FIG. 10 is a schematic illustration of a typical compression profile 1000 in one embodiment. Referring to FIG. 10, the compression profile 1000 for each compressive actuator is characterized by at least one of various parameters including, but not limited to: a maximum compression 1002, a duration 1004 over which the maximum compression is generated, an onset time 1006 to achieve maximum compression after activation of the compression actuator 210, and a release time 1008 to return from maximum compression 1002 to a deactivated (non-compression generating) state.

Referring again to FIG. 4, each of the at least one compression actuator 210A/210B/210C generates compression according to the same predetermined compression profile 1000 in one embodiment. In various other embodiments, each of the at least one compression actuator 210A/210B/210C generates compression according to a predetermined compression profile 1000 defined uniquely for each compression actuator 210A/210B/210C. In additional embodiments, different predetermined compression profiles 1000 are defined for different doors 102 on the same vehicle 100 and/or different vehicles 100 to adjust for differences in the size or contour of the vertical sash 106 profiles and/or door garnish 104 associated with individual doors 102. Other compression profiles 1000 are possible, including, but not limited to, cyclically applying a maximum compression over multiple cycles and/or applying compression at two or more different magnitudes over the course of the compression profile 1000.

In various embodiments, the maximum compression is selected to achieve wet-out of the adhesive tape segments 108/110 situated between the door garnish 104 and the vertical sash 106 without damaging any component of the vehicle door 102. In various embodiments, the maximum compression selected for the compression profile may be increased if the press head 202 includes a relatively low number of compression actuators 210 and may be decreased for a relatively high number of compression actuators 210 to modulate the net force experienced by the vertical sash 106 of the vehicle door 102 during installation of the door garnish 104 using the sash garnish press 200. In one embodiment, the maximum compression 1002 is at least 40 psi. In other embodiments, the maximum compression 1002 may be of at least 45 psi, at least 50 psi, at least 55 psi, at least 60 psi, at least 65 psi, at least 70 psi, at least 75 psi, or at least 80 psi.

In one embodiment, all of the compression actuators 210A/210B/210C may generate compression simultaneously. In another embodiment, the compression actuators 210A/210B/210C may generate compression according to a predetermined compression sequence. By way of non-limiting example and referring again to FIG. 4, the predetermined compression sequence may include activating compression actuator 210A, then compression actuator 210B, and finally compression actuator 210C, resulting in a downward sweep of compression over the contact element 216. The predetermined compression sequence of this non-limiting example may be reversed to enable an upward sweep of compression over the contact element 216. Referring again to FIG. 4, in various other embodiments, other predetermined compression sequences may include, but not limited to, activation of a more centrally situated compression actuator 210B followed by activation of compression actuators 210A/210C situated near each end of the contact element 216.

In various embodiments, the compression actuator 210 may be any known actuator capable of generating compression including, but not limited to, mechanical actuators, hydraulic actuators, pneumatic actuators, and any other known actuator suitable for generating compression. Non-limiting examples of suitable mechanical actuators include leadscrews and roller screws. Non-limiting examples of suitable hydraulic actuators include hydraulic pistons. Non-limiting examples of suitable pneumatic actuators include pneumatic pistons and pneumatic bladders. In one exemplary embodiment, the compression actuators 210 are pneumatic bladders. In various embodiments, the compression actuator may be pneumatically controlled, hydraulically controlled, or electronically controlled. In an exemplary embodiment, the compression actuators 210 are pneumatic actuators that are pneumatically controlled.

In various embodiments, the number of compression actuators 210 included in the press head 202 may range from 1 to about 10 actuators. In various other embodiments, the number of compression actuators 210 included in the press head 202 may be 1, 2, 3, 4, 5, 6, 7, 8, 9, or 10 actuators. Without being limited to any particular theory, a higher number of compression actuators 210 may enable a higher degree of control over the spatial distribution of compression over the door garnish 104 and/or the ability of the press head 202 to conform to the contour of the door garnish 104.

In some embodiments, each compression actuator 210 is affixed to the compression base 208 so that the free end 214 of each compression actuator 210 projects from the compression base 208 at a fixed orientation and height. In other embodiments, each compression actuator 210 is attached to the compression base 208 so that the angle and/or height of the projecting free end 214 of each compression actuator 210 is adjustable. In one embodiment, the projecting free end 214 of each compression actuator 210 is attached to the compression base 208 using a manually adjustable mechanical fitting including, but not limited to, a lockable hinge or lockable ball joint, so that each free end 214 of each compression actuator 210 may be manually adjusted to enhance the degree of fit of the press head 202 with the contour of the door garnish 104. In another embodiment, the projecting free end 214 of each compression actuator 210 is attached to the compression base 208 using an actuated fitting including, but not limited to, an actuated hinge or actuated ball joint, so that each free end 214 of each compression actuator 210 may be adjusted, by either manual or automatic control of the actuated fitting to enhance the degree of fit of the press head 202 with the contour of the door garnish 104.

Referring again to FIG. 4, the sash garnish press 200 may further include the support head 204 to support the vertical sash 106 of the vehicle door 102 and to provide a reactive force as the press head 202 compresses the door garnish 104 against the vertical sash 106 during installation of the door garnish 104 using the sash garnish press 200. As illustrated in FIG. 4, the support head 204 includes at least one support pad 218A/218B/218C attached to a support base 220. Each support pad 218 is attached to the support base 220 at a fixed pad end 222 so that a free pad end 224 projects from the support base 220 at an angle selected to conform to the contour of the vertical sash 106 opposite to the attached door garnish 104.

In various embodiments, the at least one support pad 218A/218B/218C is constructed of a non-marring material to reduce the likelihood of scratching, denting, deforming, or otherwise altering the external appearance of vertical sash 106 opposite to the door garnish 104 as a result of affixing the door garnish 104 to the vertical sash 106 using the sash garnish press 200 as described herein below. In another embodiment, the at least one support pad 218A/218B/218C provides a non-slip interface to provide robust support of the vertical sash 106. In some embodiments, the contact element 216 is constructed of a compressible material to facilitate a more gradual application of compressions to the door garnish 104 and thereby reduce the possibility of damage to the door garnish 104 or to the vertical sash 106 as a result of affixing the door garnish 104 using the sash garnish press 200. Further, the compressible material is capable of deforming under the compression generated by the press head 202 to enhance the conformation of each support pad 218 to the contour of the vertical sash 106 opposite to the door garnish 104. Non-limiting examples of suitable compressible and/or non-marring materials include: rubbers, polymers such as polypropylene and polyurethane, silicone, and any combination thereof.

Referring again to FIG. 3, the press head 202 and the support head 204 of the sash garnish press 200 are mechanically supported by a frame 206 in various embodiments. In one embodiment, illustrated in FIG. 3, the press head 202 may be attached to the frame 206 using a first mechanical attachment 226 and the support head 204 may be attached to the frame 206 using a second mechanical attachment 228. In various embodiments, the first and second mechanical attachments 226/228 may be adjustable to provide for positioning the press head 202 and the support head 204 within a range of positions and orientations in order to align with the vertical sash 106 and door garnish 104 of a variety of vehicle doors 102.

In one embodiment, the first and second mechanical attachments 226/228 are configured to reversibly couple to the frame 206. In this embodiment, the first mechanical attachment 226 is configured to be decoupled from the frame 206, repositioned, and recoupled to the frame 206 to reposition the press head 202 for changes in the position and/or orientation of the vertical sash 106 of different vehicle doors 102. Similarly, the second mechanical attachments 228 is configured to be decoupled from the frame 206, repositioned, and recoupled to the frame 206 in a similar manner in this embodiment. The first and second mechanical attachments 226/228 in this embodiment are configured to translate and/or rotate relative to the frame in various embodiments. The first and second mechanical attachments are any known device suitable for attaching an actuated element to a frame including, but limited to, a clamp such as a quick-release clamp or a clamp plate as illustrated in FIG. 3.

To further facilitate the repositioning of the press head 202 and the support head 204, the press head 202 may be attached to the first mechanical attachment 226 with one or more first articulated segments 230 and the support head 204 may be attached to the second mechanical attachment 228 with one or more second articulated segments 232 in various embodiments. The first and second articulated segments 230/232 are configured to rotate with respect to adjacent segments in one or more directions to further enable adjusting the positions and/or orientations of the press head 202 and the support head 204, respectively. The articulation between adjacent segments of the first and second articulated segments 230/232 are selected from any suitable known articulation including, but not limited to: single-axis rotation joints such as pin joints, knuckle joints, or hinge joints; and multi-axis rotation joints such as ball joints. In various embodiments, the articulations are reversibly lockable to enable the first and second articulated segments 230/232 to be repositioned manually for different vehicle doors 102. In other embodiments, the articulations may be actuated to enable the activation of one or more actuators to reposition the press head 202 and the support head 204 in various embodiments.

Referring again to FIG. 3, a press head actuator 234 may be attached to the press head 202 between the at least one first articulated segment 230 and/or first mechanical attachment 226 in one embodiment. The press head actuator 234 is configured to translate the press head 202 toward the support head 204 in order to establish direct contact between the press head 202 and the door garnish 104 and vertical sash 106 prior to applying compression as described herein below. In one embodiment, the press head actuator 234 may be manually operated for each vehicle door 102. In another embodiment, the press head actuator may be automatically operated according to prestored instructions as part of an automated process.

Figure 5:
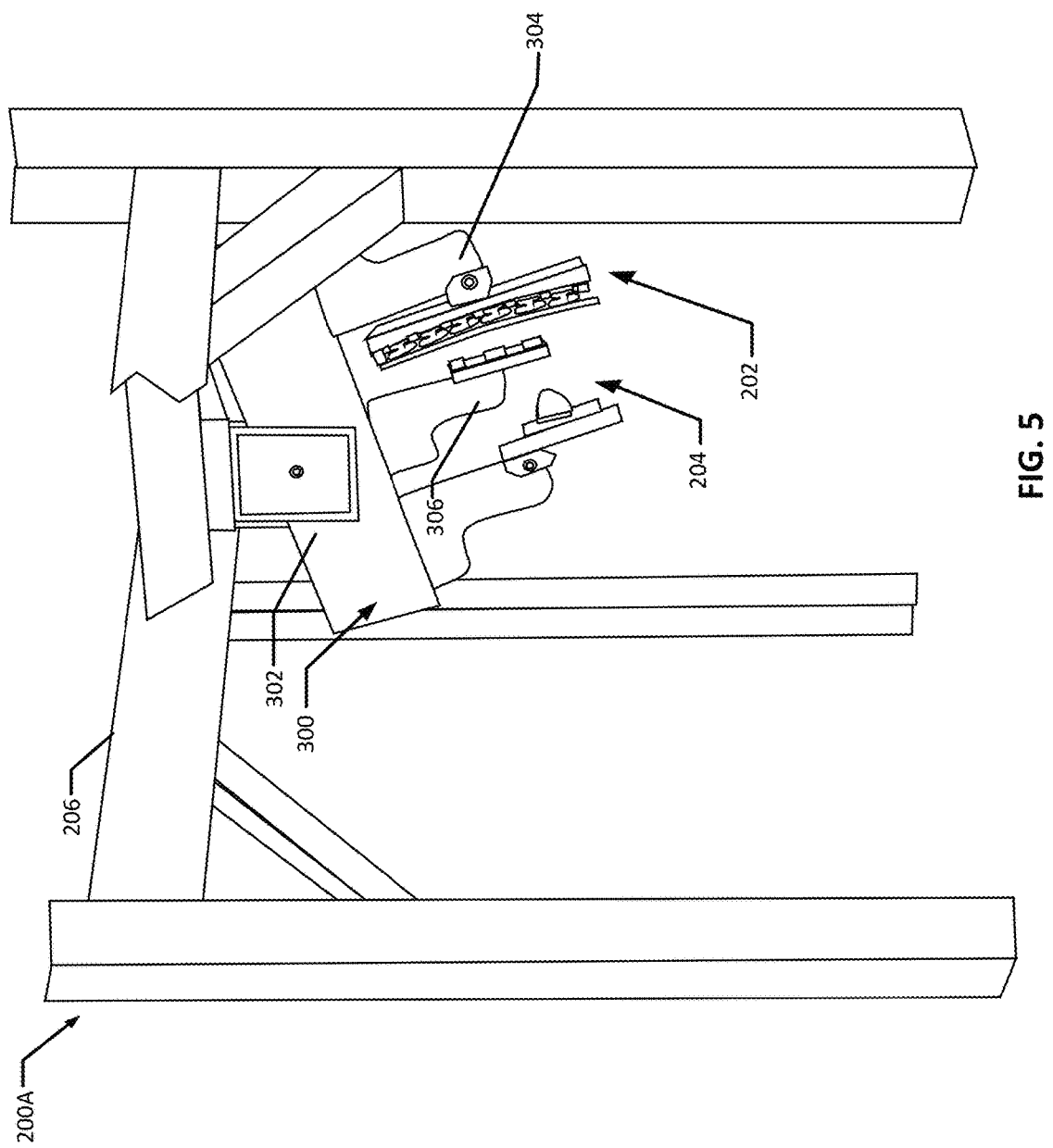
FIG. 5 is a perspective view of a sash garnish press system in accordance with one embodiment.

FIG. 5 is a perspective view of a sash garnish press 200A that includes the press head 202 and the support head 204 mounted on an actuated platform 300 attached to the frame 206 in one embodiment. The actuated platform 300 enables the automated repositioning of the press head 202 and the support head 204 by adjusting elements of the actuated platform 300. In one embodiment, the actuated platform 300 may include a rotating main platform 302 configured to rotate the remaining elements of the actuated platform 300 while maintaining the relative position and orientation of the press head 202 and the support head 204 for use with different vehicle doors 102. In this embodiment, the rotating main platform 302 enables the rotation of the press head 202 and the support head 204 in a coordinated manner to adjust for changes in the vertical orientation of the vertical sashes 106 of different vehicle doors 102.

Referring again to FIG. 5, the actuated platform 300 may further include an actuated press head mounting arm 304. In one embodiment, the press head 202 is attached to the press head mounting arm 304 at one end, and the opposite end of the press head mounting arm 304 is attached to the rotating main platform 302. In one embodiment, the actuated press head mounting arm 304 includes one or more actuators configured to translate and/or rotate the press head 202 to reposition the press head 202 for use with different vehicle doors 102. In another embodiment, one of the actuators of the press head mounting arm 304 translates the press head 202 toward the support head 204 in order to establish direct contact between the press head 202 and the door garnish 104 and vertical sash 106 prior to applying compression as described herein below.

Referring again to FIG. 5, the actuated platform 300 may further include an actuated support head mounting arm 306. In one embodiment, the press head 202 is attached to the press head mounting arm 304 at one end, and the opposite end of the press head mounting arm 304 is attached to the rotating main platform 302. In one embodiment, the actuated press head mounting arm 304 includes one or more actuators configured to translate and/or rotate the press head 202 to reposition the press head 202 for use with different vehicle doors 102. In another embodiment, one of the actuators of the press head mounting arm 304 translates the press head 202 toward the support head 204 in order to establish direct contact between the press head 202 and the door garnish 104 and vertical sash 106 prior to applying compression as described herein below.

Referring again to FIG. 5, the actuated platform 300 may further include an actuated support head mounting arm 306. In one embodiment, the support head 204 is attached to the support head mounting arm 306 at one end, and the opposite end of the support head mounting arm 306 is attached to the rotating main platform 302. In one embodiment, the actuated support head mounting arm 306 includes one or more actuators configured to translate and/or rotate the support head 204 to reposition the support head 204 for use with different vehicle doors 102.

In one embodiment, the actuated platform 300 may be operated manually to adjust the position and orientation of the press head 202 and the support head 204 for use with different vehicle doors 102 as described herein below. In another embodiment, the actuated platform 300 may be operated automatically to adjust the position and orientation of the press head 202 and the support head 204 according to a set of stored parameters associated with one type of vehicle door 102. In this other embodiment, the stored parameters may be accessed manually by an operator based on the operators identification of the type of door 102 on which a door garnish 104 is to be affixed, or alternatively the stored parameters may be accessed automatically as part of an automated process as described herein below.

In various embodiments, the sash garnish press 200 may optionally include one or more sensors to facilitate the process of affixing a door garnish 104 to a vertical sash 106 using the sash garnish press 200. In one embodiment, the sash garnish press 200 may include one or more force or pressure sensors including, but not limited to, a load cell. In this embodiment, the force or pressure sensor is configured to monitor the compression generated by the at least one compression actuator 210. The compression measured by the one or more force or pressure sensors may provide feedback for the operation of the at least one compression actuator 210. In another embodiment, the compression measured by the one or more force or pressure sensors provides feedback for the operation of the at least one compression actuator 210. In an additional embodiment, the compression measured by the one or more force or pressure sensors is recorded and/or transmitted to a central memory device for use in monitoring the quality of the automated process enabled by the sash garnish press 200. By way of non-limiting example, the measured maximum compression generated by each compression actuator 210 may be transmitted to a stored quality control database of a quality control application to monitor process quality.

In another embodiment, the sash garnish press 200 may optionally include a bar code reader configured to read a bar code on the vehicle door 102 or on a pallet transporting the vehicle door 102 through the sash garnish press 200. In this other embodiment, the bar code includes information identifying the door and/or door garnish 104 entering the sash garnish press 200. This identifying information may include, but is not limited to, the vehicle model; the door type on the vehicle model (i.e. front left door, rear right door, etc.); the type of door garnish 104 to be applied (baseline, deluxe, etc.) and any other relevant information about the vehicle door 102. In various embodiments, the information received by the bar code reader is used to select at least one process parameter associated with the use of the sash garnish press 200 so that operation of the sash garnish press 200 can be customized to application of a specific door garnish 104 to a specific vehicle door 102 including, but not limited to: the position and orientation of the press head 202 and support head 204 relative to the vehicle door 102; the one or more compression profiles 1000 for each of the compression actuators 210 to match operation of the press head 202 to the curve of the vehicle door 102; individual actuator settings associated with the operation of the sash garnish press 200; and any other relevant parameter associated with the operation of the sash garnish press 200. In various additional embodiments, other sensor types may be used to identify the door type including, but not limited to: cameras in association with image recognition software, RFIDs, and any other known sensor type used to categorize and/or label individual pieces within a manufacturing or warehouse setting.

In additional embodiments, the sash garnish press 200 may further include position sensors including, but not limited to, proximity sensors to detect the position of the vehicle door 102 with respect to the press head 202 and the support head 204. In these additional embodiments, the position sensors may be configured to monitor the area surrounding the sash garnish press 200 and to trigger one or more phases of an automated process in response to the detection of a vehicle door 102 within a predefined distance relative to the sash garnish press 200. In addition, the position sensors may be configured to provide feedback to the sash garnish press 200 used to fine-tune the position and alignment of the vertical sash 106 and door garnish 104 relative to the press head 202 and the support head 204 of the sash garnish press 200. Non-limiting examples of suitable position sensors include reed switches, hall sensors, and the like.

In another embodiment, the sash garnish press 200 may further include environmental sensors including, but not limited to: temperature sensors, humidity sensors, and sensors configured to monitor any other relevant environmental parameter. The environmental sensors monitor environmental factors that potentially impact the process of affixing a door garnish 104 to the vertical sash 106 of a vehicle door 102 using the sash garnish press 200. By way of non-limiting example, a temperature sensor may be used to monitor room temperature and the measured temperature may be used as feedback to adjust the one or more compression profiles 1000 as needed. In another non-limiting example, the room temperature measured by the temperature sensor may deactivate the sash garnish press 200 if the measured room temperature falls outside a predetermined temperature range (for example above approximately 15° C. and/or below 45° C.) within which the adhesive is capable of generating suitable adhesive forces. In this example, if the adhesive used to affix the door garnish 104 to the vertical sash 106 has material properties such as viscosity or stiffness that vary with respect to temperature, the compression profile may be altered in response to a high measured room temperature to reduce the maximum compression and/or duration of maximum compression to adjust for the temperature-altered adhesive properties.

Method of Affixing Door Garnish to Vertical Sash Using Sash Garnish Press

Figure 6:
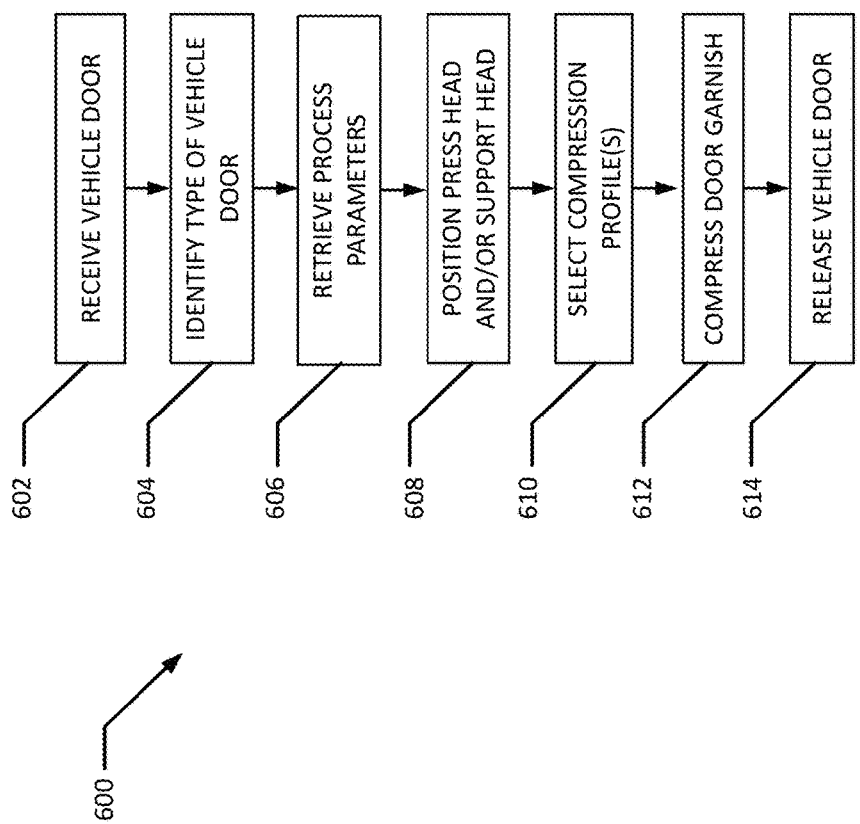
FIG. 6 is a flow chart summarizing the steps of a method of attaching a door garnish to a vertical sash of a vehicle window using a sash garnish press in accordance with one embodiment.

In various embodiments, the sash garnish press 200 may be used to implement a method of affixing a door garnish 104 to the vertical sash 106 of a vehicle door 102. FIG. 6 is a flow chart illustrating the steps of a method 600 of affixing a door garnish 104 using a sash garnish press 200 in one embodiment. In various embodiments, the order of method steps and/or devices or methods used to implement the steps of the method 600 may vary depending on the particular embodiment of the sash garnish press 200, as described herein below.

Figure 7:
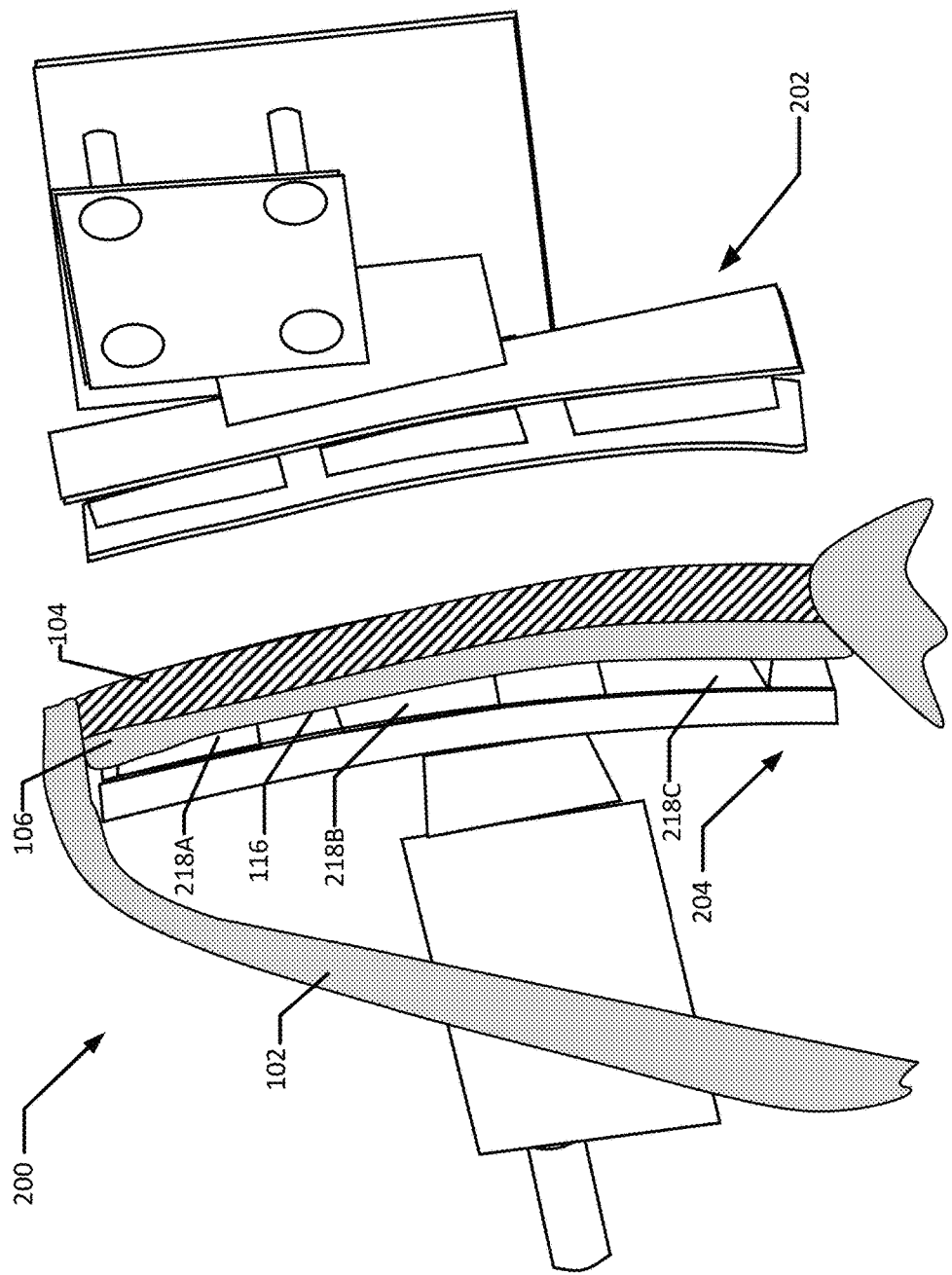
FIG. 7 is a perspective view of a vertical sash of a window situated between a press head and a support head of a sash garnish press system in accordance with one embodiment.

Referring again to FIG. 6, the method 600 includes receiving the vehicle door 102 by the sash garnish press 200 at step 602. FIG. 7 is an illustration of the vertical door sash 106 of a vehicle door 102 positioned within the sash garnish press 200 at the completion of step 602. As illustrated in FIG. 7, an inner surface 116 of the vertical sash 106 opposite the door garnish 104 is positioned over the support pads 118A/118B/118C of the support head 204. In one embodiment, the door 102 may be supported on a pallet (not shown). In one embodiment, the door 102 may be manually placed on the pallet and situated within the sash garnish press 200. In another embodiment, the pallet and door 102 are conveyed along a track or conveyor associated with a vehicle production line. In this other embodiment, the pallet may be conveyed along the track or conveyor using manual control or the track or conveyor may be automatically controlled. In an additional process, the position of the door 102 may be sensed by a position sensor (not illustrated) of the sash garnish press 200. In various embodiments, the position sensor may provide feedback to an operator manually positioning the door 102 within the sash garnish press 200 via a signal including but not limited to an auditory or visual feedback signal such as a flashing light or audible tone produced by the position sensor. In various other embodiments, the position sensor may provide feedback to the track or conveyor to stop the track or conveyor when the door 102 is properly positioned within the sash garnish press 200.

Referring again to FIG. 6, the method 600 may further include identifying the type of vehicle door 102 at step 604. As described herein above, the type of vehicle door 102 may be identified visually by a production line operator in one embodiment. The type of vehicle door 102 may also be automatically identified using a bar code reader or other sensor to read a bar code, RFID tag, or any other identifying tag affixed to the vehicle door 102 and/or to the pallet conveying the vehicle door 102 in various other embodiments.

Referring again to FIG. 6, the method 600 may further include retrieving one or more process parameters at step 606. In one embodiment, the one or more process parameters are entered manually by a production line operator based on the type of vehicle door 102 identified at step 604. In another embodiment, the type of vehicle door 102 automatically identified using a bar code reader or other sensor at step 604 may be used to retrieve the one or more process parameters from a database at step 606.

In various embodiments, the database may include a plurality of entries in which each entry includes the one or more process parameters associated with the operation of the sash garnish press 200 for one of the types of vehicle doors 102. In one aspect, each entry of the database further includes an index identifying the type of vehicle door, and is used to retrieve the at least one process parameter according to any known database searching methods and database retrieval methods. Non-limiting examples of the one or more process parameters stored in each entry of the database include: the position and orientation of the press head 202 and support head 204 relative to the vehicle door 102; the one or more compression profiles 1000 for each of the compression actuators 210 to match operation of the press head 202 to the curve of the vehicle door 102; individual actuator settings associated with the operation of the sash garnish press 200; and any other relevant parameter associated with the operation of the sash garnish press 200. In one embodiment, the database is stored on a storage device.

As used herein, the term "storage device" may refer to any computer-operated hardware suitable for storing and/or retrieving data. By way of non-limiting example, the storage device may include one or more storage units such as hard disks or solid state disks in a redundant array of inexpensive disks (RAID) configuration. In some embodiments, the storage device may include a storage area network (SAN) and/or a network attached storage (NAS) system.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored on a storage device. The above examples are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods to function as described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Figure 8:
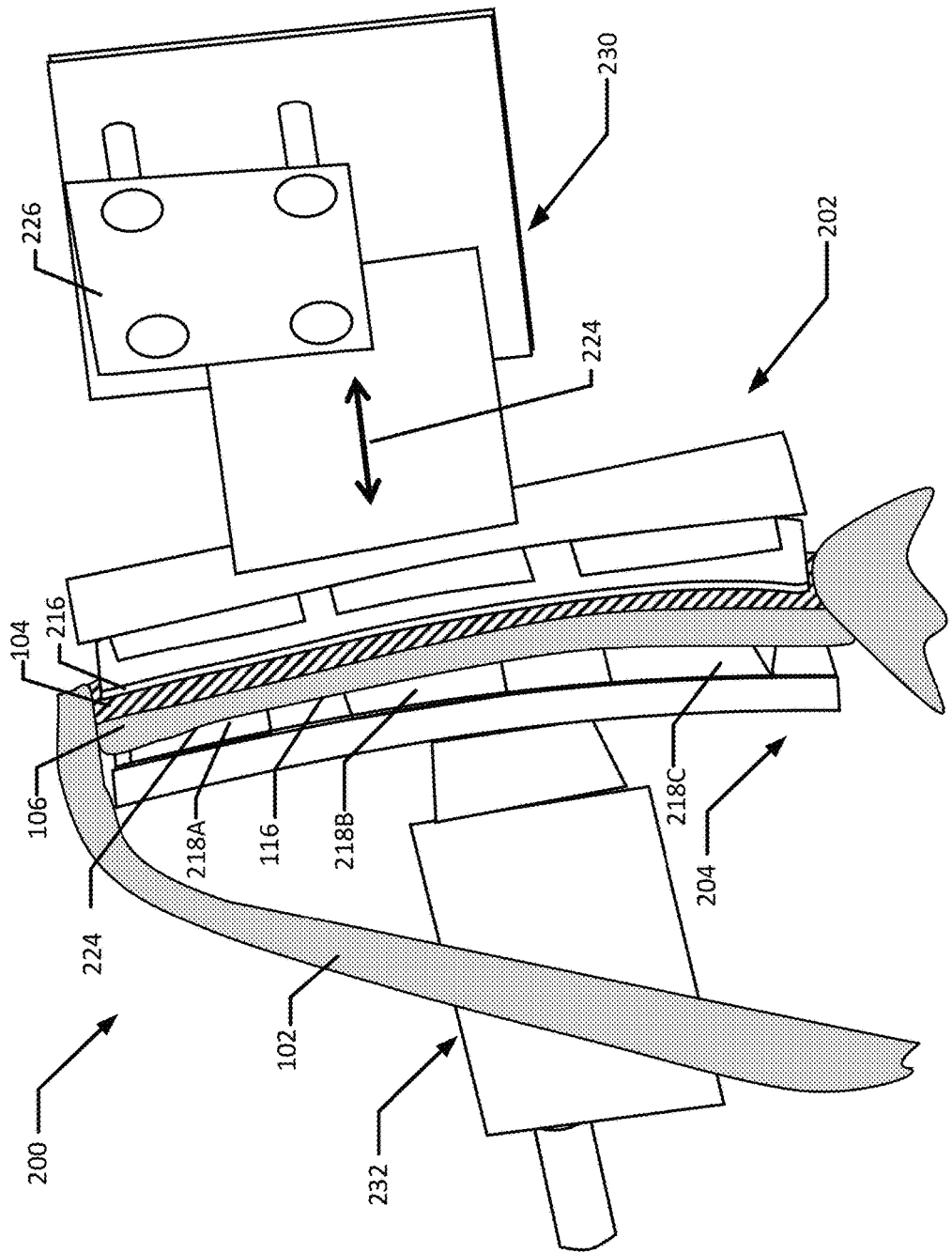
FIG. 8 is a perspective view of a press head and a support head of a sash garnish press system in which the press head is positioned in contact with a door garnish of a vertical window sash in accordance with one embodiment.

Referring again to FIG. 6, the method 600 may further include positioning the press head 202 and/or support head 204 at step 608. FIG. 8 is a perspective view of the press head 202 and/or support head 204 after positioning at step 608. As illustrated in FIG. 8, the support head 204 is positioned such that the inner surface 116 of the vertical sash 106 contacts the free pad end 224 of each support pad 218A/218B/218C. As further illustrated in FIG. 8, the press head 202 is positioned such that the contact element 216 contacts the door garnish 104. In one embodiment, the vehicle door 102 is received by the sash garnish press 200 at step 602 such that the inner surface 116 of the vertical sash 106 contacts the free pad end 224 of each support pad 218A/218B/218C, as illustrated in FIG. 7. In this embodiment, only the press head 202 is positioned at step 608.

In one embodiment, the press head 202 and/or support head 204 are positioned manually at step 608 by manipulating the first articulated segments 230 and/or second articulated segments 232 and locking the press head 202 and/or support head 204 in place as described herein above. In another embodiment, the press head actuator 234 attached to the press head 202 between the at least one first articulated segment 230 and/or first mechanical attachment 226 may be activated to translate the press head 202 toward the door garnish 104. In yet another embodiment (not illustrated) the one or more actuators of the press head mounting arm 304 by which the press head 202 is mounted to the actuated platform 300 (as illustrated in FIG. 5) may be activated to position the press head 202 at step 608. In this other embodiment, the one or more actuators of the support head mounting arm 306 by which the support head 204 is mounted to the actuated platform 300 (see FIG. 5) may be activated to position the support head 204 at step 608. In various embodiments, if the press head 202 and/or support head 204 are positioned by activating actuators as described above, the actuators may be controlled manually by a production line operator or the actuators may be automatically controlled using at least a portion of the process parameters retrieved at step 606. The process parameters in this other embodiment may include one or more actuator settings configured to activate the actuators and position the press head 202 and/or support head 204 as described above and as illustrated in FIG. 8.

Referring again to FIG. 6, the method 600 may further include selecting the compression profiles 1000 at step 610. In various embodiments, the compression profiles 1000 are used to operate the one or more compression actuators 210 of the press head 202. As described herein above, each compression profile 1000 may be uniquely defined for each compression actuator 210 and vehicle door type. In one embodiment, the compression profiles 1000 are entered manually by a production line operator based on the type of vehicle door 102 identified at step 604. In another embodiment, the type of vehicle door 102 automatically identified using a bar code reader or other sensor at step 604 may be used to retrieve the compression profiles 1000 from the stored database at step 610.

Figure 9:
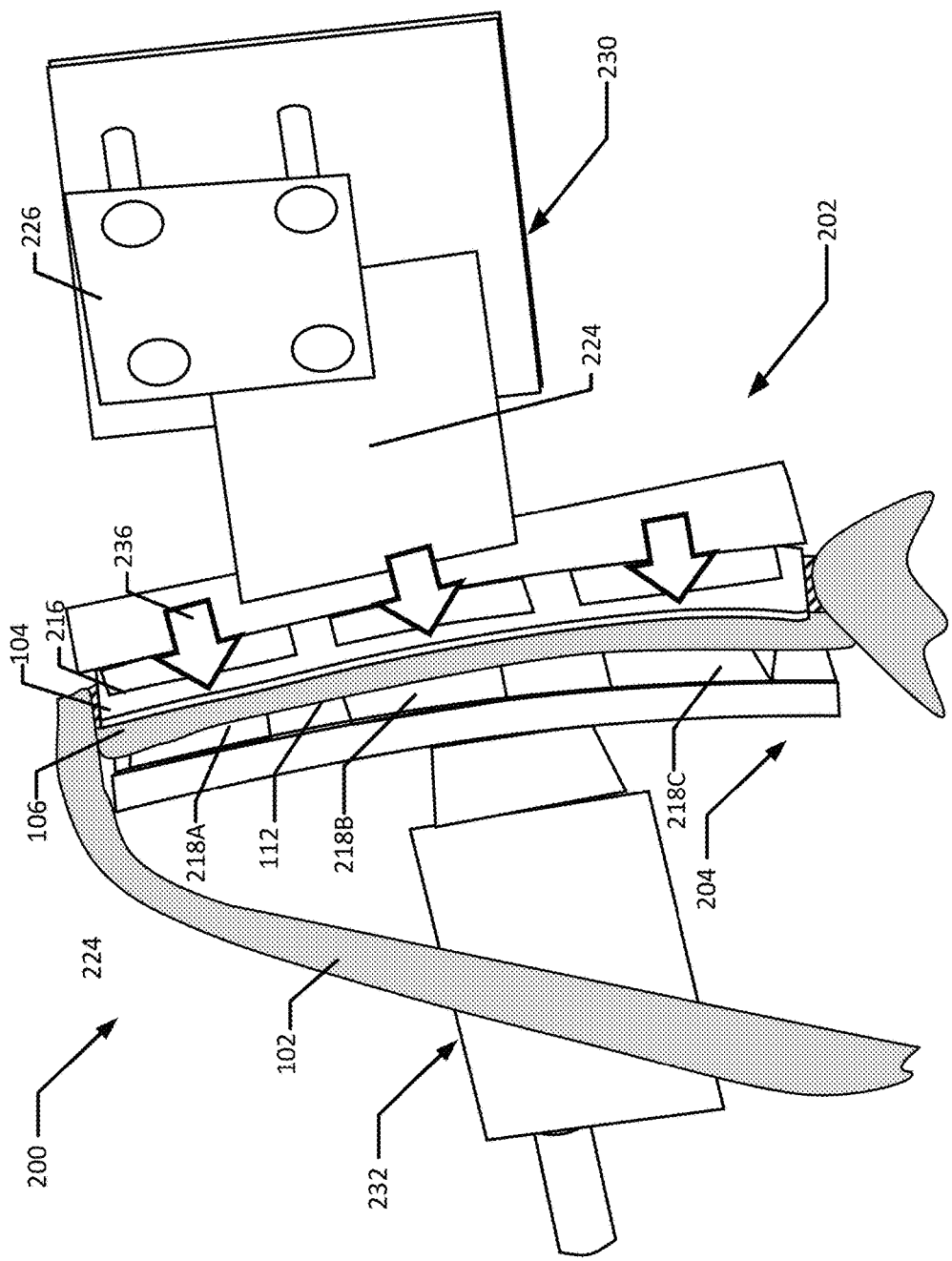
FIG. 9 is a perspective view of a press head and a support head of a sash garnish press system in which the press head is applying compression to a door garnish of a vertical window sash in accordance with one embodiment.

Referring again to FIG. 6, the method 600 may further include compressing the door garnish 104 at step 612 to affix the door garnish 104 to the vertical sash 106. FIG. 9 is an illustration showing the door garnish 104 undergoing compression 236 by the sash garnish press 200. As described herein above, the door garnish 104 is compressed in a controlled and repeatable manner by operating the at least one compression actuator 210A/210B/210C according to the compression profiles 1000 retrieved at step 612. In various embodiments, the at least one compression actuator 210A/210B/210C may be operated manually by a production line operator or the at least one compression actuator 210A/210B/210C may be operated in an automated manner.

Referring again to FIG. 6, after the door garnish 104 is affixed to the vertical sash 106 at step 612, the vehicle door 102 may be released by the sash garnish press 200 at step 614. In various embodiments, the vehicle door 102 may be released by repositioning the press head 202 and/or support head 204 back to positions and orientations associated with receiving a vehicle door 102 into the sash garnish press 200, as illustrated in FIG. 7. In various embodiments, the press head 202 and/or support head 204 are repositioned using methods similar to the methods by which the press head 202 and/or support head 204 were positioned at step 608.

In various embodiments, the method 600 may be repeated as needed to affix additional door garnishes 104 to additional vertical sashes 106 of additional vehicle doors 100. As discussed herein previously, the sash garnish press 200 is configured to reposition the press head 202 and/or support head 204 and to modify the operation of the compression actuators 210 to accommodate different vehicle doors 102.

The above described embodiments of a sash garnish press facilitate application of a repeatable, sufficient pressure along substantially the entire length of a door garnish in order to adhesively couple the door garnish to the vehicle door.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A sash garnish press for affixing a door garnish comprising an adhesive to a vertical sash of a vehicle door, the sash garnish press comprising:
   a press head comprising at least one compression actuator and each compression actuator configured to apply compression to at least a portion of the door garnish; and
   a support head comprising at least one support pad, the at least one support pad configured to support the vertical sash during compression of the at least a portion of the door garnish;
   wherein the vertical sash and door garnish are positioned between the press head and the support head and the at least one compression actuator is activated to compress the adhesive between the door garnish and the vertical sash, thereby affixing the door garnish to the vertical sash, wherein the at least one compression actuator is maintained in a stationary position relative to the door garnish during compression.

2. The sash garnish press of claim 1, wherein the press head further comprises a contact element attached to a free end of each of the at least one compression actuators, the contact element comprising a flexible sheet configured to conform to a contour of the vertical sash.

3. The sash garnish press of claim 2, wherein the contact element comprises a non-marring material selected from a rubber, a flexible polymer, silicone, and nylon.

4. The sash garnish press of claim 1, wherein the at least one compression actuator comprises at least three compression actuators arranged in a linear array.

5. The sash garnish press of claim 4, wherein each compression profile is activated according to a compression profile selected from a plurality of predetermined compression profiles, each compression profile defining a time course of compression generated by each of the at least one compression actuators, wherein each compression profile is characterized by at least one compression parameter selected from: a maximum compression, a duration of compression, an onset time, and a release time.

6. The sash garnish press of claim 5, wherein the maximum compression of each of the at least one compression actuators is at least about 40 psi.

7. The sash garnish press of claim 6, wherein the plurality of predetermined compression profiles comprises a dataset of compression profiles, each compression profile corresponding to one door type and one compression actuator, wherein each door type comprises a vehicle make and door position on the vehicle.

8. The sash garnish press of claim 7, wherein the support head and the press head are coupled to a frame to form a station of a production line.

9. The sash garnish press of claim 8, wherein the support head and the press head are coupled to the frame using an actuated platform coupled to the frame, the actuated platform comprising:
a main platform coupled to the frame, the main platform comprising a first actuator configured to rotate the actuated platform relative to the frame;
a press head mounting arm attached at one end to the main platform and to the press head at an opposite end, the press head mounting arm comprising at least one press head actuator configured to translate and/or rotate the press head; and
a support head mounting arm attached at one end to the main platform and to the support head at an opposite end, the support head mounting arm comprising at least one support head actuator configured to translate and/or rotate the support head; wherein
the first actuator, the at least one press head actuator, and the at least one support head actuator operate in a coordinated manner to position the press head adjacent to the door garnish and to position the support head adjacent to an inner surface of the vertical sash opposite to the door garnish.

10. The sash garnish press of claim 9, wherein the first actuator, the at least one press head actuator, and the at least one support head operate according to at least one process parameter defining at least one actuator setting associated with assuming a position of the press head and/or the support head.

11. The sash garnish press of claim 10, wherein the at least one process parameter is selected from a dataset of predetermined process parameter sets, each process parameter set comprising at least one process parameter associated with positioning the press head and/or the support head with respect to one door type.

12. The sash garnish press of claim 11, further comprising a bar code reader configured to read a bar code affixed to the vehicle door or a pallet configured to transport the vehicle door to the sash garnish press, wherein the bar code encodes the door type.

13. The sash garnish press of claim 12, wherein the door type identified using the bar code reader is used to automatically select at least one compression profile associated with the door type and/or a process parameter set associated with the door type.

14. A method of affixing a door garnish comprising an adhesive to a vertical sash of a vehicle door using a sash garnish press comprising a press head and a support head, the method comprising:
receiving the vehicle door within the sash garnish press, wherein the vertical sash and the door garnish are positioned between the press head and the support head;
positioning the press head adjacent to the door garnish and positioning the support head adjacent to an inner surface of the vertical sash opposite to the door garnish; and
operating at least one compression actuator of the press head to apply compression to the door garnish to affix the door garnish to the vertical sash, wherein the at least one compression actuator is maintained in a stationary position relative to the door garnish during compression.

15. The method of claim 14, further comprising:
identifying a door type of the vehicle door;
retrieving at least one process parameter associated with the door type; and
operating the sash garnish press in accordance with the at least one process parameter.

16. The method of claim 15, wherein retrieving at least one process parameter comprises at least one of:
retrieving at least one process parameter associated with positioning the press head and/or the support head relative to the door garnish and/or vertical sash associated with the door type; and
retrieving at least one compression profile associated with the door type, each compression profile defining a time course of compression generated by each of the at least one compression actuators.

17. The method of claim 16, wherein operating the sash garnish press in accordance with the at least one process parameter comprises at least one of:
positioning the press head and/or support head using the at least one process parameter; and
operating at least one compression actuator of the press head using the at least one compression profile.

18. The method of claim 15, wherein identifying the door type of the vehicle door comprises:
providing a bar code reader configured to read a bar code affixed to the vehicle door or a pallet used to transport the vehicle door to the sash garnish press; and
reading the bar code encoding the door type using the bar code reader.

19. The method of claim 15, wherein:
the sash garnish press further comprises a proximity sensor to monitor the proximity of the door garnish to the press head and/or the proximity of the support head to the inner surface of the vertical sash; and
the press head and the support head are positioned using the at least one process parameter when the proximity sensor indicates that vertical sash is positioned between the press head and the support head.

20. A production line station comprising a sash garnish press for affixing a door garnish comprising an adhesive to a vertical sash of a vehicle door, the production line station comprising:
a frame configured to support the sash garnish press; and
the sash garnish press comprising:
an actuated platform attached to the frame, the actuated platform comprising:
a main platform coupled to the frame, the main frame comprising a first actuator configured to rotate the actuated platform relative to the frame;
a press head mounting arm attached at one end to the main platform and to a press head at an opposite end, the press head mounting arm comprising at least one press head actuator configured to translate and/or rotate the press head; and
a support head mounting arm attached at one end to the main platform and to the support head at an opposite end, the support head mounting arm comprising at least one support head actuator configured to translate and/or rotate the support head;
the press head comprising at least one compression actuator, each compression actuator configured to apply compression to at least a portion of the door garnish;
the support head comprising at least one support pad, the at least one support pad configured to support the vertical sash during compression of the at least a portion of the door garnish, wherein:

the first actuator, the at least one press head actuator, and the at least one support head operate in a coordinated manner to position the press head adjacent to the door garnish and to position the support head adjacent to an inner surface of the vertical sash opposite to the door garnish;

the at least one compression actuator is activated to compress the adhesive between the door garnish and the vertical sash, thereby affixing the door garnish to the vertical sash; and the at least one compression actuator is maintained in a stationary position relative to the door garnish during compression.

* * * * *